(12) United States Patent
Leigh

(10) Patent No.: US 8,868,601 B2
(45) Date of Patent: Oct. 21, 2014

(54) DISTRIBUTED FILE SYSTEM LOGGING

(75) Inventor: Richard Leigh, Hursley Park (GB)

(73) Assignee: International Business Machines Corporation, Armonk, NY (US)

( * ) Notice: Subject to any disclaimer, the term of this patent is extended or adjusted under 35 U.S.C. 154(b) by 646 days.

(21) Appl. No.: 12/839,600

(22) Filed: Jul. 20, 2010

(65) Prior Publication Data

US 2011/0040811 A1 Feb. 17, 2011

(30) Foreign Application Priority Data

Aug. 17, 2009 (GB) .................................. 09167985.2

(51) Int. Cl.
*G06F 17/30* (2006.01)

(52) U.S. Cl.
CPC .............................. *G06F 17/30227* (2013.01)
USPC ......................................... 707/770; 714/723

(58) Field of Classification Search
CPC ...................................................... G06F 17/30
USPC .......... 707/648, 672, 682, 676, 633, 999.202, 707/770, E17.032, 966, 999.01, 999.107; 714/E11.204, 723
See application file for complete search history.

(56) References Cited

U.S. PATENT DOCUMENTS

| | | | |
|---|---|---|---|
| 5,668,988 A | | 9/1997 | Chen et al. |
| 5,758,356 A | * | 5/1998 | Hara et al. ..................... 707/683 |
| 5,799,141 A | | 8/1998 | Galipeau et al. |
| 6,131,094 A | | 10/2000 | Gord |
| 6,298,386 B1 | | 10/2001 | Vahalia et al. |
| 6,539,341 B1 | * | 3/2003 | Li et al. .......................... 702/187 |
| 6,836,894 B1 | | 12/2004 | Hellerstein et al. |
| 6,856,993 B1 | * | 2/2005 | Verma et al. ............................ 1/1 |
| 7,062,781 B2 | * | 6/2006 | Shambroom ................... 726/10 |
| 7,099,897 B2 | * | 8/2006 | Huras et al. .................... 707/648 |
| 7,356,590 B2 | | 4/2008 | Wilson et al. |
| 7,360,214 B2 | | 4/2008 | Satomi et al. |
| 7,506,375 B2 | | 3/2009 | Kanda et al. |
| 7,568,131 B2 | * | 7/2009 | Vertes ............................. 714/45 |
| 7,653,633 B2 | * | 1/2010 | Villella et al. ................ 707/648 |
| 7,653,836 B1 | * | 1/2010 | Chatterjee et al. .............. 714/20 |

(Continued)

FOREIGN PATENT DOCUMENTS

GB 2366050 A * 2/2002 .............. G06F 11/34

OTHER PUBLICATIONS

The Big Moose Saloon; could i prepare JMS for tranfer way file?; JavaRanch; Feb. 26, 2008; http://saloon.javaranch.com/cgi-bin/ubb/ultimatebb.cgi?ubb=get_topic&f=11&t=014459.

*Primary Examiner* — Anteneh Girma
*Assistant Examiner* — Randall Burns
(74) *Attorney, Agent, or Firm* — Parashos Kalaitzis; Robert C. Rolnik; David Mims

(57) ABSTRACT

A method, system, and computer program for consolidating data logged in log files in a network of servers, each server running at least one application that logs data into files on the server, the method comprising: providing a consolidating message queue for receiving the log data and file name; intercepting log data being written into a log file by a file system and sending that log data and the file name of the log file to a consolidating message queue; receiving the log data and file name in a consolidating message queue; and saving the log data in the consolidating message queue from all the servers to a consolidated file or data structure associated with the file name.

13 Claims, 2 Drawing Sheets

(56) References Cited

U.S. PATENT DOCUMENTS

| | | |
|---|---|---|
| 7,827,447 B2* | 11/2010 | Eberbach et al. ............... 714/45 |
| 8,041,683 B1* | 10/2011 | Korolev et al. ............... 707/672 |
| 2002/0087949 A1 | 7/2002 | Golender et al. |
| 2002/0165902 A1* | 11/2002 | Robb et al. ................... 709/202 |
| 2002/0178382 A1* | 11/2002 | Mukai et al. ................. 713/201 |
| 2004/0059789 A1* | 3/2004 | Shum ........................... 709/206 |
| 2004/0139128 A1* | 7/2004 | Becker et al. ................. 707/204 |
| 2005/0114285 A1* | 5/2005 | Cincotta ........................... 707/1 |
| 2006/0167916 A1* | 7/2006 | Vertes ........................... 707/101 |
| 2006/0253733 A1 | 11/2006 | Galipeau et al. |
| 2007/0011300 A1* | 1/2007 | Hollebeek et al. ............ 709/224 |
| 2007/0011334 A1* | 1/2007 | Higgins et al. ................ 709/227 |
| 2007/0208784 A1* | 9/2007 | Beeston et al. ............... 707/203 |
| 2008/0276130 A1* | 11/2008 | Almoustafa et al. ............ 714/47 |
| 2009/0132607 A1* | 5/2009 | Danesi et al. ................. 707/202 |

* cited by examiner

DISTRIBUTED FILE SYSTEM LOGGING

FOREIGN APPLICATION PRIORITY DATA

This application claims benefit of priority of Foreign Patent Application No. 09167985.2, filed in the European Patent Office on Aug. 17, 2009, which is herein incorporated by reference.

BACKGROUND OF THE INVENTION

1. Field of the Invention

This invention relates to a distributed file system logging system and method. In particular this invention relates to a distributed file system logging system and method that intercepts file system writes to log files.

2. Description of the Related Art

In a mass virtual hosting Web cluster, a Web application can run as many instances on many Web Servers or virtual Web Servers in the Web cluster. Each instance of a Web application will write status data to at least one log file resulting in many log files in many places and a complicated developer review. The number of log files can easily become too large for quick review and some consolidation is required. Several solutions have been proposed to consolidate the log files.

U.S. Pat. No. 7,356,590, filed by the Visible Measures Corporation, discloses a distributed capture and aggregation of dynamic application usage information that uses an application tracking method to access and view aggregated log files. The application tracking method sits in an application layer and listens for events and forwards the events to an aggregated log file.

U.S. Patent Application No. 2002/0087949, filed by Golender, V, et al, discloses a system and method for software diagnostics using a combination of visual and dynamic tracing and comprises information gathering modules. Each information gathering module gathers user input and output and consolidates such input and output for diagnostics.

U.S. Pat. No. 6,298,386, filed by the EMC Corporation, discloses a network file server having a message collector queue for connection and connectionless oriented protocols. Connection messages are intercepted and collected in the collector queue.

All of the above solutions rely on changes to be made to the application running on the server so when a new application is loaded then changes must be made.

Another known method of consolidating the log files is to perform batch merging of the log files when the web application is idle. However, due to the interactive nature of developing/debugging web applications and following log files, developers need near real time access to the log files. If the Web application is not idle for long periods then batch merging is always out of date.

In normally secure applications, developers are not allowed interactive access to the web servers. Furthermore, if the Web cluster had a load balancing mechanism then it would be difficult to find which Web server a particular debugging session had used.

Network solutions where the log file is saved remotely in a consolidated network place tend to be unreliable and are not preferred since log files are required for audit purposes.

Applications that solve this problem by logging to a database need to understand the large number of tables and database connections that would be needed in a mass virtual hosting application such as this prevent this approach.

It is also possible for Web servers to pipe access logs into processes but this is not the case for error logs.

U.S. Patent Application No. 2006/025373, filed by the EMC Corporation, discloses backing up selected files of a computer system by using a mirroring driver attached to file system driver to create back-up copies of data files concurrently with changes to data files. However, this disclosure does not address the problem of consolidating data logs.

SUMMARY OF THE INVENTION

According to one aspect of the invention there is provided a distributed file system logging method.

According to another aspect of the invention there is provided a distributed file system logging system.

According to another aspect of the invention there is provided a distributed file system logging computer program product.

By combining guaranteed once-and-only once messaging, a chosen file system, and a simple daemon, logs are written to a flat file (as far as the web server can see) with no special logging configured. Under the covers, the file system is actually intercepting the low level file operations and placing complete log file lines onto a queue. The queue is a remote definition of a queue on another server. This queue is then read by a remote logging server, which places the log lines from all the other servers into the appropriate files.

Preferably, only entire log lines are sent to the message queue. By sending only entire lines, logs are not susceptible to interleaving as may happen with naive network implementations.

More preferably a local message queue is used in each Web server and a consolidating message queue consolidates all the messages.

Any service from any number of machines can now receive aggregate logs with no code changes or other modifications. Should the remote logging server be down or not running, log lines are not lost.

There is a single additional process on each machine regardless of the number of applications/virtual hosts that use this logging solution.

For the most part log lines will arrive in chronological order at the remote end but for absolute chronological order a timestamp on message in the queue would serialize them in the appropriate order.

BRIEF DESCRIPTION OF THE DRAWINGS

Embodiments of the invention will now be described, by means of example only, with reference to the accompanying drawings in which.

DETAILED DESCRIPTION OF THE PREFERRED EMBODIMENT

System Architecture

Figure 1:
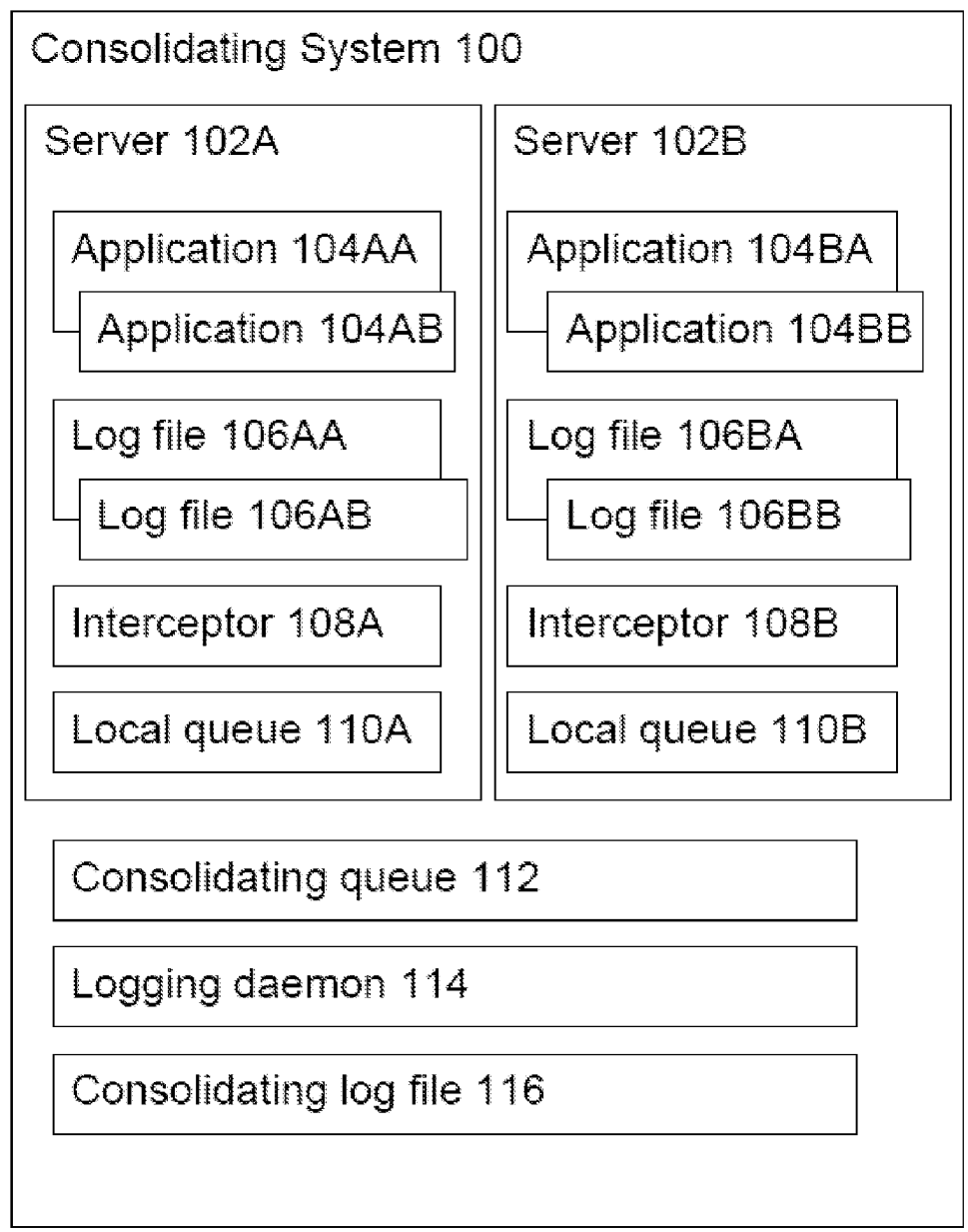
FIG. 1 is a schematic of a distributed file system logging system according to the present embodiment.

FIG. 1 shows the preferred embodiment in a cluster of Web servers. The preferred embodiment is consolidating system 100 that consolidates log files on more than one server 102A and 102B, in a network. Each server 102A and 102B, runs at least one application 104AA, 104AB, 104BA, or 104BB that logs data into a log file 106AA, 106AB, 106BA, or 106BB on that server. The servers 102A and 102B are also comprised of a file system interceptor 108A and 108B, and a local message queue 110A and 110B. Consolidating system 100 may also contain a consolidating message queue 112, logging daemon 114, and consolidating log file 116.

Each file system interceptor 108A, 108B is an interceptor of file system write operations located on each server and configured so that when log data is written into a log file then that log data, the file name of the log file and the server name is sent to the local message queue and subsequently to the consolidating message queue. In the preferred embodiment a timestamp is additionally sent to the message queue and whereby the merged view can sort the log data in absolute chronological order although for general purposes the log data would be received in roughly the correct chronological order.

In this embodiment the file system interceptor is part of a virtual file system implemented in Linux using a loadable kernel module; the loadable kernel module allows non-privileged users to create their own file systems without editing the kernel code. One particularly useful kernel module is called Filesystem in Userspace (FUSE), however, an interceptor could be implemented in any kernel module or any file system for any operating system. When starting the virtual file system, it is necessary to make sure the consolidating message queue and the address of the message queue is identified so that the interceptor can be configured to send messages to the consolidating message queue at the message queue address. This configuration step need only be taken once so that the virtual file system component is mounted in the standard manner on each Web server.

The Web servers are configured to write their log files into a directory within this mount point. After configuration, the interceptor intercepts the minimal number of system calls needed to fool Web applications writing to the file system that the file system is responding as expected. File system read operations are not required in a logging scenario, so the interceptor needs to act as write only. By default, the file system is empty, however, over the course of time it will acknowledge the existence of files that have been written to during its lifetime, to aid system administration as much as anything. It makes no attempt to resemble the state of the files on the remote end, as this functionality is not needed for a logging solution. Each write call is scanned for complete lines. Once a complete logging line is found (or the file is closed), the file system puts a message onto the local message queue, consisting of the file name, server name and the log file entry. The message is then sent over the network to the address of the consolidating message queue and the logging daemon.

Each local message queue system 110A, 110B, is used in a preferred embodiment for greater reliability but a single message queue at the consolidating end would work effectively in normal operating conditions. The local message queue ensures that a message will be sent and that the data logging is completed in a very secure and reliable manner.

The consolidating message queue 112 is for receiving the log data, file name, server name and time stamp from the Web servers in the network. An example of one message queue is IBM WebSphere MQ; another example of a message queue is the Java Messaging Service. IBM, MQ, and WebSphere are registered trademarks of International Business Machines in the United States and/or other countries. Java is a trademark of Sun Microsystems in the United States and/or other countries.

The logging daemon 114 saves the log data, file name and server name in consolidating log file 116 and provides a merged view of the log data, file name, and server name from the saved log data, file name, and server name. In the preferred embodiment the merged view is provided in real time while server is running the at least one application. The logging daemon can run on the same platform as the message queue. The daemon listens for messages, receives the logging data, and writes (creating files if necessary) the log entry into a file of the file name given in the message. The logging daemon then flushes the file to disk. No special consideration is given to security in this instance, though through appropriate use of firewalls, network encryption, authentication etc. sensitive information can be protected and considered genuine.

System Method

Figure 2:
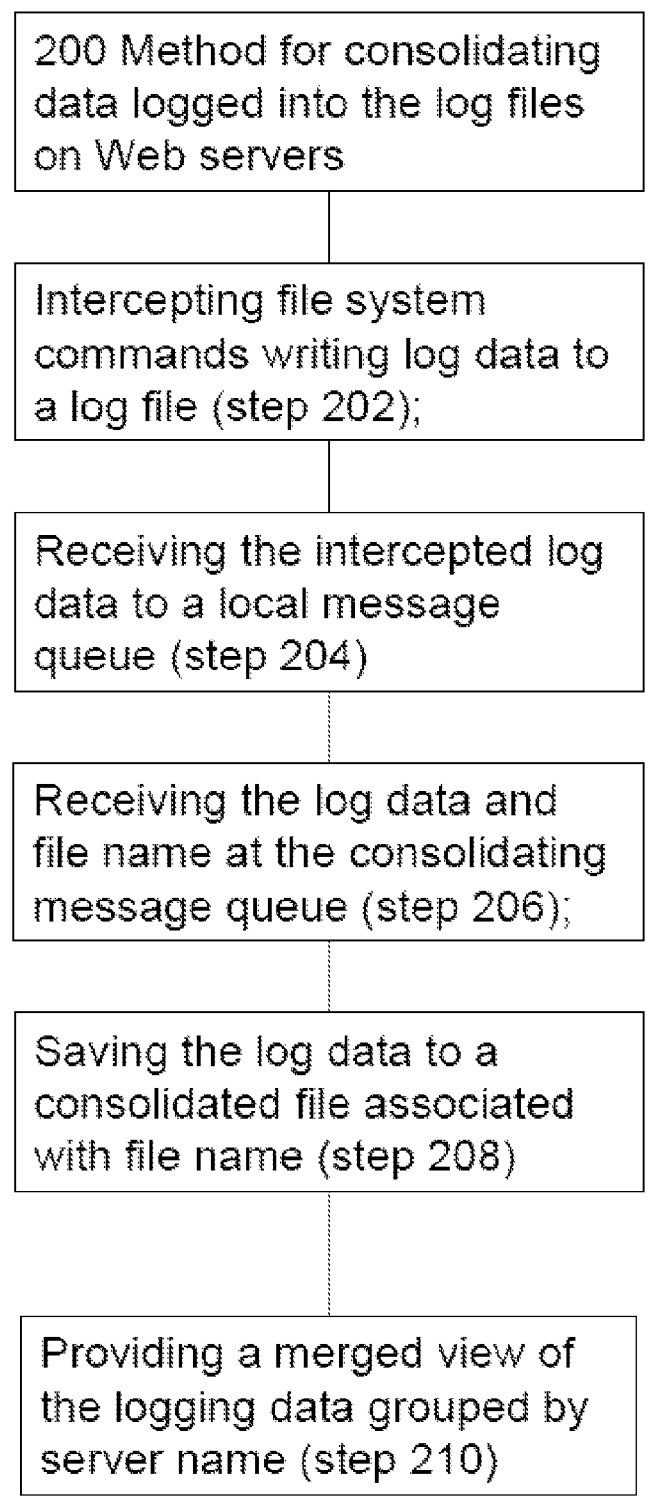
FIG. 2 is a schematic of a distributed file system logging method of the preferred embodiment of the invention.

The method of the preferred embodiment is described with reference to FIG. 2. In the network of servers, each server runs at least one application that logs data into files on the server, the method of consolidating the data logged into the log files on the server (step 200) comprising: intercepting file system commands writing log data to a log file (step 202); receiving the log data and file name at a local message queue (step 204); receiving the log data and file name at the consolidating message queue (step 206); saving, by the logging daemon, the log data to a consolidated file associated with file name (step 208); and providing a merged view of the logging data grouped by server (step 210).

In step 202, log data written into a log file (the log data, the file name of the log file and the server name) is intercepted and sent to a local message queue on the Web server. In another embodiment a timestamp is additionally sent to the local message queue.

In step 204, the log data, file name and server name is received in the local message queue from the interceptor, and subsequently sent to the consolidating message queue.

In step 206, the log data, file name and server name is received in the consolidated queue from multiple Web applications running on multiple Web servers.

In step 208, the log data, file name and server name is saved by the logging daemon. Each separate log data is saved in the same order so that a sequential list of all consolidated log data is built up in the consolidated log file.

In step 210, a merged view of the log data, file name, and server name is provided from the saved log data, file name, and server name. In the preferred embodiment the merged view is provided in real time while server is running the at least one application. In the timestamp embodiment, the merged view can sort the log data in absolute chronological order.

OTHER EMBODIMENTS

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method, and that such logic elements may comprise hardware components, firmware components, or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like.

The present invention may further suitably be embodied as a computer program product for use with a computer system. Such an implementation may comprise a series of computer-readable instructions either fixed on a computer readable storage device, for example, diskette, CD-ROM, ROM, or hard disk. The series of computer readable instructions embodies all or part of the functionality previously described herein. The term "computer-readable storage device" does not encompass a signal propagation media such as a copper transmission cable, optical transmission fiber or wireless transmission media.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical. It is contemplated that such a computer program product may be distributed as a removable storage device with accompanying printed or electronic documentation, for example, shrink-wrapped software, pre-loaded with a computer system, for example, on a system ROM or fixed disk.

In an alternative, the preferred embodiment of the present invention may be realized in the form of a computer implemented method of deploying a service comprising steps of deploying computer program code operable to, when deployed into a computer infrastructure and executed thereon, cause the computer system to perform all the steps of the method.

In a further alternative, the preferred embodiment of the present invention may be realized in the form of a data carrier having functional data thereon, the functional data comprising functional computer data structures to, when loaded into a computer system and operated upon thereby, enable the computer system to perform all the steps of the method. It will be clear to one skilled in the art that many improvements and modifications can be made to the foregoing exemplary embodiment without departing from the scope of the present invention.

What is claimed is:

1. A method of consolidating log files comprising:
    scanning a write call to a log file for log data that is a completed line, and in response, sending the log data, a file name of the log file and a server name to a consolidating message queue, wherein the log data is written, in each case, by one of at least two file servers;
    receiving the log data and the file name of the log file in the consolidating message queue;
    executing a logging daemon to save the log data to a consolidated file associated with the file name of the log file, to form saved log data, wherein the consolidated file is on a server separate from the at least two file servers and the consolidated file has a name identical to the file name of the log file; and
    providing a merged view of the log data from the at least two file servers, the file name and the server name from the saved log data wherein the merged view comprises log data in absolute chronological order.

2. The method according to claim 1, further comprising sending a timestamp to the consolidating message queue and storing the saved log data in absolute chronological order.

3. The method according to claim 1, wherein the merged view is provided in real time while at least one of the at least two file servers is running at least one application.

4. A system of consolidating data logged in log files, the system comprising:
    an at least one of at least two file servers for scanning a write call for log data that is a completed line, and in response, sending the log data, a file name of the log file and a server name to a consolidating message queue, wherein the log data is written, in each case, by the at least one of the at least two file servers, wherein each of the at least two file servers has one or more processors, each file server running at least one application;
    a server for executing a logging daemon to save the log data to a consolidated file associated with the file name of the log file to form saved log data wherein the consolidated file is on the server, and the server is separate from the at least two file servers, and wherein the consolidated file has a name identical to the file name of the log file; and
    the server for providing a merged view of the log data from the at least two file servers, the file name and the server name from the saved log data, wherein the merged view comprises the log data in absolute chronological order.

5. The system according to claim 4, wherein the merged view is provided in real time.

6. The system according to claim 4, further comprising the at least one of the at least two file servers sending a timestamp to the consolidating message queue and storing the saved log data in absolute chronological order.

7. A computer program product for consolidating data logged in log files, the computer program product comprising: a computer readable storage device having computer usable program code embodied therewith, the computer program product comprising computer readable code which when loaded onto a computer system and executed performs the following steps:
    providing a consolidating message queue for receiving a log data and a file name of a log file;
    scanning a write call to the log file for the log data that is a completed line, and in response, sending the log data, the file name of the log file and a server name to the consolidating message queue, wherein the log data is written, in each case, by one of at least two file servers, wherein each of the at least two file servers has one or more processors, each file server running at least one application;
    receiving the log data and the file name in the consolidating message queue;
    executing a logging daemon to save the log data to a data structure associated with the file name, to form saved log data, wherein the data structure is on a server separate from the at least two file servers and the data structure has a name identical to the file name of the log file; and
    providing a merged view of the log data from the at least two file servers, the file name and the server name from the saved log data wherein the merged view comprises log data in absolute chronological order.

8. The computer program product according to claim 7, the computer readable code in response to loading onto the computer system and executing further performs the following steps:
    sending the server name with the log data;

saving the server name with the log data; and providing the merged view of the log data with the server name.

9. The computer program product according to claim 7, wherein a timestamp is sent to the consolidating message queue and whereby the saved log data is sorted in absolute chronological order.

10. The computer program product according to claim 7, wherein the merged view is provided in real time.

11. The computer program product according to claim 8, wherein a timestamp is sent to the consolidating message queue; and in response to saving the log data to the data structure, sorting the log data in absolute chronological order.

12. The computer program product according to claim 11, wherein the merged view is provided in real time.

13. The computer program product according to claim 8, wherein the merged view is provided in real time.

* * * * *